United States Patent

[11] 3,551,739

[72] Inventor Hans Jurg Bossi
Nussbaumen, Switzerland

[21] Appl. No. 799,631

[22] Filed Feb. 17, 1969

[45] Patented Dec. 29, 1970

[73] Assignee Aktiengesellschaft Brown, Boveri & Cie
Baden, Switzerland
a joint stock company

[32] Priority Feb. 16, 1968

[33] Switzerland

[31] No. 2331/68

[54] THYRISTOR CHAIN COMPRISING THYRISTORS CONNECTED IN SERIES
2 Claims, 3 Drawing Figs.

[52] U.S. Cl. ........................................................ 315/200,
315/201, 315/205, 315/208; 307/239, 307/241, 307/242

[51] Int. Cl. ........................................................ H05b 37/00

[50] Field of Search ........................................... 315/200, 201, 202, 205, 208; 307/237, 239, 241, 242, 248, 252, 256, 257, 258, 299, 302, 317, (Inquired)

[56] References Cited

UNITED STATES PATENTS 3,350,623 10/1967 Clapp ........................... 307/317X

*Primary Examiner*—James D. Kallam
*Assistant Examiner*—R. F. Polissack
*Attorney*—Pierce, Scheffler & Parker

ABSTRACT: A thyristor chain comprises a number of series-connected thyristor groups each of which contains a series connection of several thyristors paralleled by avalanche diodes and an inductance, and a capacitance connected in parallel with the entire group. The inductance is composed of two parts located in the series circuit at opposite ends of the group and a bridging diode oppositely poled with respect to the conducting direction of the thyristors is connected in parallel with each inductance part.

b.

a.

INVENTOR.
Hans Jurg Bossi
BY
Pierce, Scheffler & Parker
Attorneys

INVENTOR.
Hans Jurg Bossi
BY
Pierce, Scheffler & Parker
Attorneys

THYRISTOR CHAIN COMPRISING THYRISTORS CONNECTED IN SERIES

The present invention relates to a thyristor chain comprising a number of series-connected thyristor groups, each of which contains a Series connection of several thyristors and of a wiring inductance as well as a wiring capacitance parallel to the entire group, and where, in order to achieve a better static voltage distribution and l imitation of the voltage peaks, diode pairs with opposed series-connected avalanche diodes (antiseries diodes) are provided, each of which is connected parallel to a thyristor.

Figure 1:
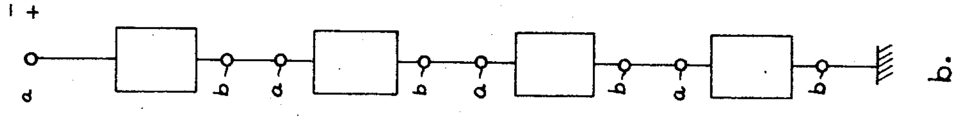
Figure 1:
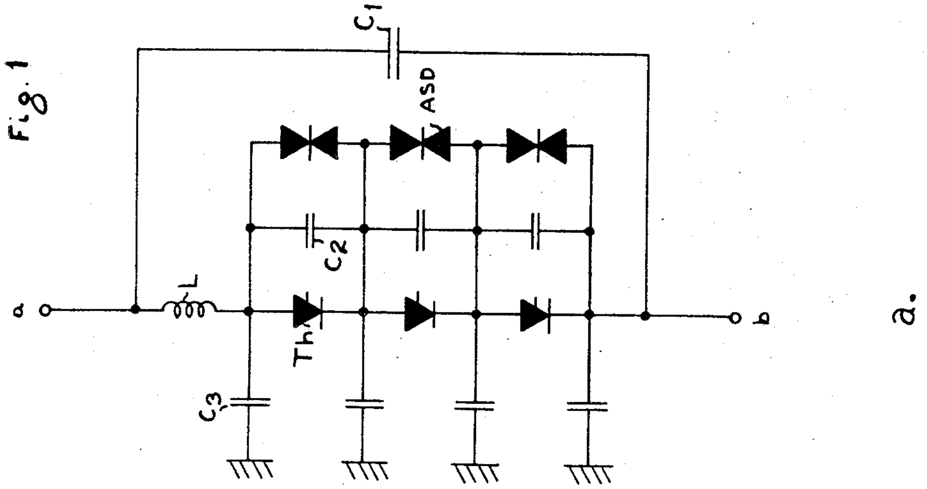

Such thyristor chains, which are known in themselves, have a number of disadvantages which will be discussed below on the basis of FIG. 1. Here can be seen in the left part of the FIG. *a* a single group of the chain with the self-capacities $C_2$ and earth capacities $C_3$ of the thyristors Th not inherent in the circuit (hence not "materialized"), while the right part *b* in the block diagram shows the wiring of the individual groups to the entire thyristor chain.

The wiring elements of such a chain have the following functions:

1. Enforcing a symmetrical static blocking voltage distribution or limiting the static blocking voltage over the individual elements. To this end are provided the wiring condenser $C_1$ (possibly connected unsymmetrically over the chain) and the antiseries avalanche diodes ASD.
2. Limiting the positive voltage rise (*du/dt*) over the individual elements; this is achieved by the wiring condenser $C_1$ which ensures a symmetrical *du/dt* distribution over the groups.
3. Preventing or damping the extinction oscillations. To this end is provided the wiring inductance (choke) L (no return current peaks).
4. Limiting the dynamic voltage peaks during ignition (different delay periods) and extinction (different carrier storage charge); these voltage peaks are taken over by the choke L.
5. Limiting the cut-in power loss of the thyristors. This function is likewise taken over by the choke (wiring inductance) L, which delays the rapid rise of the $C_1$ discharge current during ignition and which decouples the earth capacities $C_3$ of the individual thyristor groups according to FIG. l*a*.

The above mentioned disadvantages of this solution are due primarily to the fact that an excessively high positive *du/dt* stress can only be avoided by a great overdimensioning of the chokes in terms of voltage or, which amounts to the same, by the necessity of assigning a wiring inductance to a group of only a few thyristors.

This will be explained more fully on the basis of the following considerations. Let it be assumed for simplicity's sake that the inductance of the choke L acts as an ideal decoupling element in rapid voltage variations. It becomes immediately clear that the charging current for $C_3$ and $C_2$ can only flow over point *b* (FIG. 1) with rapid voltage variations. It is also obvious that the number of thyristors per group must be selected as high as possible in order to keep the number of chokes L and condensers $C_1$ small. Seen from point *b*, one thus has an idling condenser chain with longitudinal capacities $C_2$ and transverse capacities $C_3$. The transmission equivalent of this "line" is real and has the value $$\sqrt{\frac{C_3}{C_2}}$$

The ratio of the voltage $U_o$ on the choke side and of the input voltage $U_b$ of the chain is thus:

$$\frac{U_o}{U_o}=\frac{1}{\cosh\left(\sqrt{\frac{C_3}{C_2}}\cdot n\right)}$$

where *n* denotes the number of chain links. By the symbol "-cosh" is understood the hyperbola cosine, written in German mostly as "Lof." How fast the admissible limits are attained, can be seen from an example:

Chain with ten groups:

$$C_3=5\text{ pF}$$
$$C_2=200\text{ pF}$$
$$\sqrt{\frac{C_3}{C_2}}=\frac{1}{6.3}$$

The voltage over group ($U_o$—$U_b$) before the voltage leap is assumed to be zero.

The voltage leap is 50 percent of the rated chain voltage.

The maximum admissible peak blocking voltage of the group is 20 percent of the chain voltage (factor 2). One thus has cosh $$\frac{n}{6.3}$$

$=1.66$, and $n=7$.

Not considered were the nonlinear distribution over the chain, which leads to a further reduction of *n*. Desirable is an *n*-value of about 20. With the assumed capacity values one obtains for $U_o/U_b$ a ratio of 1/10.

Figure 2:
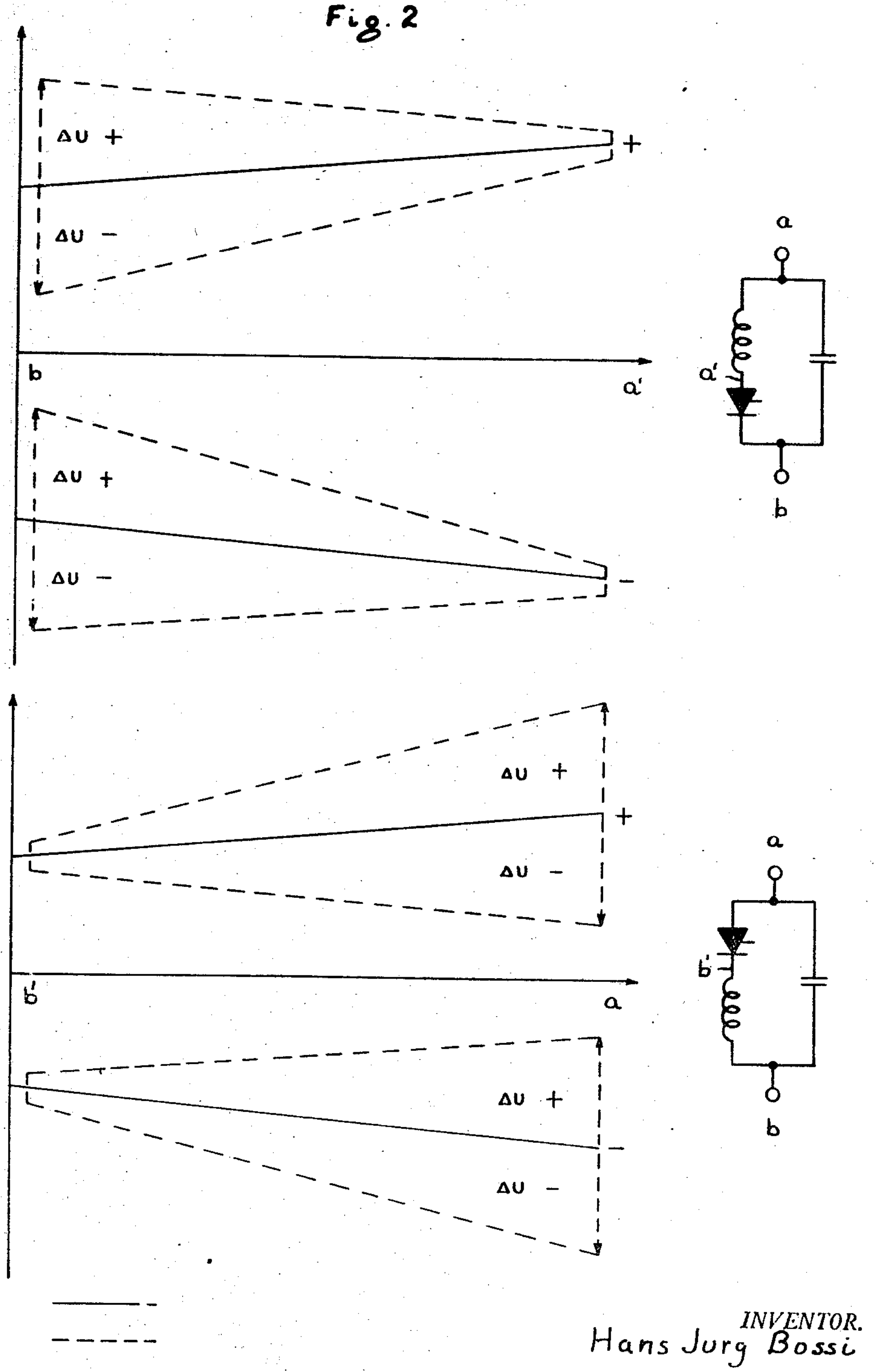

A stress beyond the admissible voltage is not harmful, since this means only the response of the AS-diodes, but one has to keep in mind that the *du/dt* stress also increases correspondingly and is not limited. FIG. 2 shows the potential course over one of the topmost groups with positive and negative leaps, and with positive and negative bias voltage. As an additional variant the choke was displaced to point *b*.

The inclination (of the linearized potential course) provides information about the size and sign of the dynamic voltage stress.

If the choke is on the *a* side, a negative voltage leap increases the positive blocking voltage. A positive voltage may have the result that the previous positive bias voltage becomes zero or even negative. With a negative bias voltage and negative voltage leap one obtains the paradox result that the thyristor blocking voltage can become positive at the first moment.

With the choke on the *b* side, one obtains positive stress only with positive leaps.

The simplest solution of the problem would be to divide the chokes on the *a* and *b* sides. But this would have the great disadvantage that the chokes at the upper groups would have to be designed for the entire leap voltage.

The object of the present invention is to find a solution for the wiring problem which prevents any positive *du/dt*, and which permits a normal layout of the choke. This is achieved according to the invention in that the wiring inductance connected in series with the thyristors consists of two preferably equal partial inductances which are arranged on one, and on the other, side respectively of the thyristor series connection in one group, and that a bridging diode, poled oppositely to the conducting direction of the thyristors, is connected in parallel to each partial inductance.

Figure 3:
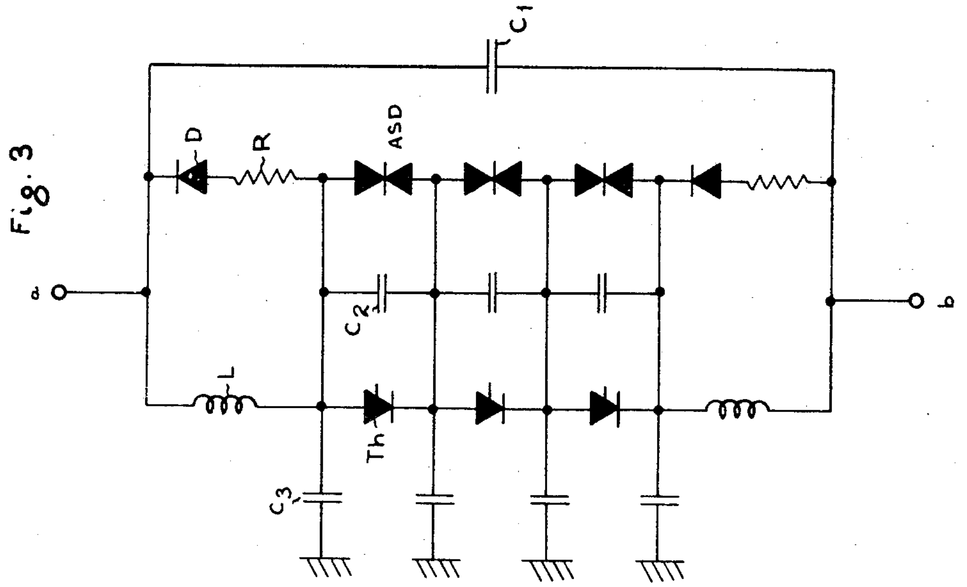

The feature of the invention will be described more fully on the basis of the embodiment represented in FIG. 3. With positive voltage leaps, the charging current flows over the bridging diode on the *b* side and the choke on the *a* side becomes operative. Inversely, with negative voltage leaps, the charging current flows over the bridging diode on the *a* side, and only the choke on the *b* side becomes operative. Rapid positive voltage variations *du/dt* do not arrive at the thyristors and the choke must be laid out only for about a three- or four-fold "-group voltage" (voltage over C1 + voltage over *n* ASD elements $=1+(2-3)\times$ group voltage). Altogether the thyristor chain can thus be laid out smaller and it is therefore more effective and cheaper than the known chain.

The circuit arrangement according to the invention has the further advantage that, in case the antiseries avalanche diodes ASD are eliminated, that is, if their function is taken over by the thyristors themselves, no charging current will flow over the thyristors having a positive avalanche voltage.

The circuit described so far has the disadvantage that the carrier return current can no longer be limited by the choke. According to a further development of the invention, this disadvantage is eliminated to a great extent by reducing the return current peak and damping the extinction oscillation by providing damping resistances R, each of which is in series with a bridging diode D and increases considerably the resistance of the latter in conducting direction. If saturable chokes are used, the resistances R serve also as remagnetization means.

I claim:

1. A thyristor chain comprising a number of series-connected thyristor groups, each of which contains a series connection of several thyristors and a wiring inductance as well as a wiring capacitance parallel to the entire group, and where, in order to achieve a better static voltage distribution and limitation of the voltage peaks, diode pairs with opposed series-connected avalanche diodes are provided, each of which is parallel to a thyristor, characterized in that the wiring inductance connected in series with the thyristors consists of two preferably equal partial inductances which are arranged on one and the other side respectively of the thyristor series connection in one group, and that a bridging diode oppositely poled with respect to the conducting direction of the thyristors, is connected in parallel to each partial inductance.

2. A thyristor chain according to claim 1, characterized in that, in order to limit the carrier return current and the camping of the extinction oscillation, as well as with the use of wiring inductances in the form of saturable chokes as remagnetization means, damping resistance are provided, each of which is connected in series with a bridging diode to increase the resistance of the latter in the conducting direction.